Feb. 2, 1932.    R. J. NORTON    1,843,621
AIRPLANE PART
Filed May 19, 1930
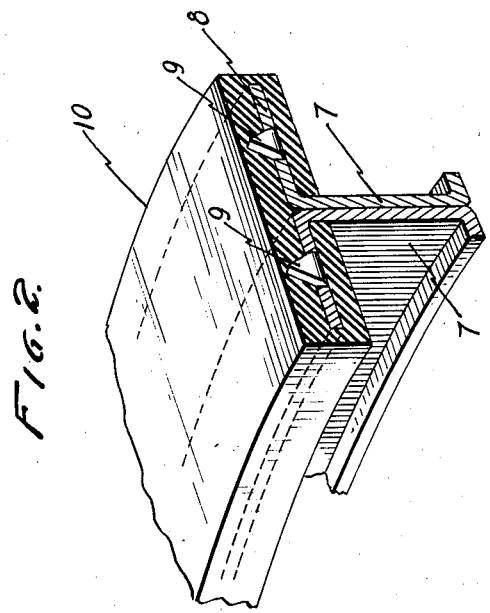
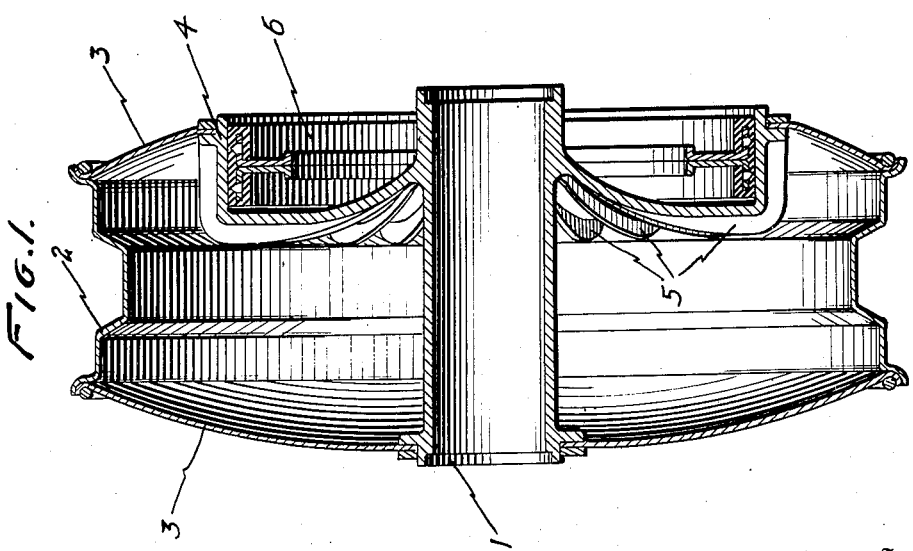
Inventor
RAYMOND J. NORTON Patented Feb. 2, 1932

1,843,621

UNITED STATES PATENT OFFICE

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS

AIRPLANE PART

Application filed May 19, 1930. Serial No. 453,791.

This invention relates to airplane parts and more particularly to an airplane brake.

The usual type of brake employed on automotive vehicles and on airplanes comprises essentially a rotating drum with which cooperates a non-rotating shoe. Disposed between the shoe and the drum is a friction material. This in the past has comprised a woven or felted asbestos bonded with a resinous substance. Of late years friction materials comprising asbestos bonded with synthetic resins have gone into wide use.

It is advantageous to construct airplane parts of materials which have a high ratio of strength to weight. In airplanes it is particularly advantageous to provide members, and especially brake members, of composite metal resin structures.

It is an object of the present invention to provide a composite metallo-resin airplane part.

Another object is to provide an airplane brake part of a high strength and light weight.

Yet another object is to provide an airplane part in which the wearing qualities of synthetic resins may be combined with the high strength of metals.

Yet another object is to provide a brake shoe comprising a moulded composite metallo-resin member that is, a member composed of metal and synthetic resin.

With these and other equally important objects in view, the invention comprehends the provision of an airplane part, and more particularly an airplane brake member, which comprises a metallic core, having a high ratio of strength to weight, about which is moulded a synthetic resin.

Fig. 1 is a transverse section taken through an airplane wheel showing the brake drum and brake shoes.

Fig. 2 is a fragmentary view of my brake shoe showing a portion of the same in section.

As noted hereinbefore, it is desirable to provide an airplane part comprising a composite metal and resin. This, however, is somewhat difficult because of the high coefficient of expansion of these resins, particularly as compared to the ordinary structural metals. This fact is indicated in the following table giving the coefficient of expansion of typical resins and typical structural metals.

Table I

| Material | Thermal expansion between 20 to 63° C. |
|---|---|
| Laminated phenolic insulating material | $20 \times 10^{-6}$ |
| Molded phenolic insulating material | 25 to $45 \times 10^{-6}$ |
| Steel | $15 \times 10^{-6}$ |
| Annealed steel | $10 \times 10^{-6}$ |
| Copper | $15 \times 10^{-6}$ |
| Nickel steel (10% nickel) | $13 \times 10^{-6}$ |
| Invar steel (36% nickel) | $.9 \times 10^{-6}$ |

It will be observed from the preceding table that the coefficient of expansions of the condensation products are very high and that if these were combined with structural metals such as carbon steel, nickel steel, or copper, there would be a decided tendency for the two materials to separate or pull apart if they were employed at elevated temperatures.

However, if there is combined with the resin a metal which has substantially the same coefficient of expansion a useful composite structure may be secured.

Now the alloy containing aluminum, at least ninety-two per cent, copper three and one-half to five and one-half per cent, magnesium two-tenths to eight-tenths of one percent, and silicon two-tenths to eight-tenths of one per cent, and herein termed for brevity an aluminum-copper-magnesium-silicon alloy, presents one of the metallic substances which can be so employed.

Other alloys which may be utilized in these composite metallo synthetic resin structures are certain magnesium alloys which are quite similar to the aluminum-copper-magnesium-silicon-alloy with respect to the thermal expansion. This latter is a factor of considerable importance in view of the fact that magnesium is one of the lightest of the commercial metals and its alloys combine the important disiderata of low tensity and relatively high strength. Hence it is possible to make up a composite structure having a core of a metallic substance of light weight and high strength which presents substantially the same coefficient of expansion, in normal temperature ranges, as the synthetic resins.

The following table indicates the proximity of the coefficient of expansion of the plastic products to these alloys.

*Table II*

| Material | Average coefficient |
|---|---|
| One type of phenolic resin between 20 and 60° C | $22 \times 10^{-6}$ |
| Phenolic resin (C. B. grade) between 25 and 60° C | $31 \times 10^{-6}$ |
| The aluminum-copper-magnesium-silicon alloy (sand cast) from 20 to 100° C | $23.4 \times 10^{-6}$ |
| The aluminum-copper-magnesium-silicon alloy (sand cast) between 20 to 250° C | $25.7 \times 10^{-6}$ |

The aluminium-copper-magnesium-silicon alloy, as is known, may be heat treated and quenched so as to materially increase its tensile strength. It will be noted that, between 20 and 200° C. this alloy has a mean coefficient of thermal expansion of about $25 \times 10^{-6}$. In other words, the expansion of this alloy approximates, or comes within the range of some of the condensation products, and therefore presents a metal which may be used making up the composite structure.

The following table indicates the proximity of the coefficient of expansion of magnesium alloys to those of the synthetic resins.

*Table III*

| | Coefficient of expansion between 20° and 100° C. |
|---|---|
| Mg. 95.56—Al. 4.44 | $26.4 \times 10^{-6}$ |
| Mg. 93.78—Al. 6.22 | $26.4 \times 10^{-6}$ |
| Mg. 89.96—Al. 10.04 | $26 \times 10^{-6}$ |

This table indicates that the coefficient of expansion of some of the magnesium base aluminum alloys correspond quite closely to the coefficient of expansion of the aluminum-copper-magnesium-silicon alloy. Furthermore this applies also to other of the magnesium alloys such as the ternary alloys of magnesium, aluminum and manganese as shown by the following table.

*Table IV*

| Materials | Average coefficient of expansion between 20° to 100° C. |
|---|---|
| Mg. 95.59—Al. 4.14—Mn. .27 | $26.6 \times 10^{-6}$ |
| Mg. 99.08—Al. .01—Mn. .91 | $26.3 \times 10^{-6}$ |

It will be seen from the preceding table that the coefficients of magnesium alloys are quite high and quite closely approximate the coefficients of expansion of the condensation products. Considered generally, the magnesium alloys have a slightly higher coefficient of expansion than the aluminum-copper-magnesium silicon alloy. These, therefore, can be employed with resinoids to provide metal resin composite structures.

While the coefficient of expansion of the resinoids are relatively high, these differ, in the commercial material, depending not only upon the composition of the particular resin but also upon the filler material. This relationship is indicated in the following table.

*Table V*

| Materials | Coefficient of expansion between 20° and 70° C. |
|---|---|
| Pure resin | 50 to $110 \times 10^{-6}$ |
| Molded resin filled with wood filler | 25 to $45 \times 10^{-6}$ |
| Molded resin filled with asbestos | 25 to $45 \times 10^{-6}$ |
| Laminated resin (paper laminæ) | 20 to $30 \times 10^{-6}$ |
| Laminated resin (canvas laminæ) | 20 to $30 \times 10^{-6}$ |

The laminated resins filled with either paper or canvas have a mean coefficient of expansion of about $25 \times 10^{-6}$ between 20° and 70° C. Therefore by a proper choice of the filler material, the coefficient of expansion of the particular resin which is to be employed may be modified so as to bring it within, or substantially within the expansivity range of the non-ferrous alloys, which are used. For this reason it is to be understood that the term resin or resinoid, or synthetic resin as herein used comprehends the whole group of these condensation products. These generic terms, for example, include such specific resins as the phenol, furfural, acetylene, and urea resins, etc.

As indicated hereinbefore the specific embodiment of the present invention relates to a composite metallo-resin brake shoe adapted particularly for use on an airplane wheel. This is made up by molding the resinoid product about a non-ferrous light weight, high strength alloy having substantially the same coefficient of expansion. It will be appreciated, however, that the invention is not limited to this, as other specific elements of the airplane, such for example as the steering wheel, strut members, elements of electrical circuit in which the dielectric properties of the resin are desired, bearings, etc. may be made up.

The specific embodiment comprises an airplane wheel including the hub 1, a tire supporting rim 2, and the intermediate web members 3. As in the usual form of airplane wheel these rims are of curved outline so as to approximate a stream line effect. A brake drum 4 may be carried by the hub as by being formed integrally therewith, and may be provided with heat radiating and strengthening ribs 5.

Mounted within the brake drum for coaction therewith is a brake shoe structure indicated generally at 6. This member may comprise two L-shaped pieces of the light weight non-ferrous alloy placed back to back and secured together through the web portions 7 by bolts or the like. The upper laterally extending flange 8 is formed with an angularly extending projection 9 which extends beyond the surface of the flange 8. Enclosing the flanges 8, projections 9, and any desired length of the web 7, is the resinoid material 10. As noted hereinbefore, this may comprise a laminated or a felted member. In applying this, assuming it is made up of laminations, the laminæ are first impregnated with a fusible form of the resin and are then forced down over the projections 9 and into close abutting relationship with the surfaces of the flange 8 by means of a suitable press. After the material has been thus positioned it may be transformed into the infusible form of the resin by the application of heat and pressure.

The metal core 7, of the shoe, may be of any desired shape and may be completely enclosed by the resin. It is obvious that with the given concept in mind, a wide variety of specific shoe structures may be made up, all of which embody the principle here involved, namely a metallo-resin article of substantial uniform expansion.

The resinoid 10 presents a very desirable friction surface and, in combination with the metal core provides an element which is eminently durable, light, and strong. If desired the weight of the article may be further cut down or diminished by forming the metal core of expanded metals.

While there is shown and described a preferred embodiment of the invention, it is to be understood that this is given as exemplifying a typical physical embodiment and not the exclusive application of the invention. It is not intended to have to limit the invention to the description of the particular structure shown, except as such limitations are clearly imposed by the appended claims.

I claim:

1. A brake shoe comprising a metallic core and a non-metallic substance moulded thereon and having substantially the same coefficient of expansion as the metallic substance.

2. An airplane part comprising a metallic element, a dielectric substance moulded thereon and having substantially the same coefficient of expansion as the metallic substance.

3. An airplane part having an aluminous alloy element, a resinoid moulded about the element and having substantially the same coefficient of expansion as the element.

4. A brake part having a magnesium alloy element, a resinoid moulded about the element and having substantially the same coefficient of expansion as the element.

5. An airplane part having an element comprising an alloy containing aluminum and magnesium, a resinoid moulded about the element and having substantially the same coefficient of expansion as the element.

6. An airplane part having an element comprising an alloy of magnesium, aluminum and manganese, a resinoid moulded about the element and having substantially the same coefficient of thermal expansion as the element.

7. A metallo-resin brake shoe having a substantially uniform coefficient of expansion throughout.

8. A brake shoe comprising a core of an aluminous alloy and a synthetic resin moulded thereon.

9. A composite member subject to structural and heating strains composed of a core of an aluminum-copper-magnesium-silicon alloy and a synthetic resin moulded thereon.

In testimony whereof I affix my signature.

RAYMOND J. NORTON.